United States Patent
Zhao et al.

(10) Patent No.: US 11,659,227 B2
(45) Date of Patent: May 23, 2023

(54) AUDIO AND VIDEO PROCESSING METHOD AND APPARATUS, TERMINAL AND STORAGE MEDIUM

(71) Applicant: GUANGZHOU KUGOU COMPUTER TECHNOLOGY CO., LTD., Guangzhou (CN)

(72) Inventors: Chongjie Zhao, Guangzhou (CN); Shengcan Xu, Guangzhou (CN); Chao Xu, Guangzhou (CN); Yudong Dai, Guangzhou (CN); Yabin Yang, Guangzhou (CN); Qianyi Wang, Guangzhou (CN); Xun Guo, Guangzhou (CN); Wentao Li, Guangzhou (CN); Meihua Ye, Guangzhou (CN)

(73) Assignee: GUANGZHOU KUGOU COMPUTER TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/415,517
(22) PCT Filed: Nov. 28, 2019
(86) PCT No.: PCT/CN2019/121454
§ 371 (c)(1),
(2) Date: Jun. 17, 2021
(87) PCT Pub. No.: WO2020/125365
PCT Pub. Date: Jun. 25, 2020

(65) Prior Publication Data
US 2022/0070523 A1  Mar. 3, 2022

(30) Foreign Application Priority Data
Dec. 21, 2018 (CN) .......................... 201811575178.3

(51) Int. Cl.
H04N 21/43 (2011.01)
H04N 5/265 (2006.01)
(Continued)

(52) U.S. Cl.
CPC ....... *H04N 21/43074* (2020.08); *H04N 5/265* (2013.01); *H04N 21/4334* (2013.01); *H04N 21/8106* (2013.01); *H04N 21/8456* (2013.01)

(58) Field of Classification Search
None
See application file for complete search history.

(56) References Cited

U.S. PATENT DOCUMENTS

2013/0163963 A1* 6/2013 Crosland ................ G11B 27/34
                                                              386/E5.028
2015/0155008 A1   6/2015 Herberger et al.

FOREIGN PATENT DOCUMENTS

CN    101640057 A    2/2010
CN    104333802 A    2/2015
(Continued)

OTHER PUBLICATIONS

European search report of European application No. 19897846.2 dated Feb. 7, 2022.
(Continued)

*Primary Examiner* — Omar S Parra
(74) *Attorney, Agent, or Firm* — Ice Miller LLP

(57) ABSTRACT

An audio and video processing method, includes: displaying a video creation interface of a target audio, where the video creation interface includes n audio clips of the target audio and video recording entries corresponding to the n audio clips respectively, n≥2; receiving a trigger signal acting on a target video recording entry on the video creation interface, where the target video recording entry is a video recording entry corresponding to a target audio clip; acquiring a target video corresponding to the target audio clip based on the trigger signal, where the target video is a video clip of which the video duration is less than a duration threshold; and sending a video creation request carrying the target video to a server, where the video creation request is
(Continued)

used to instruct to play picture information of the target video when the target audio is played.

13 Claims, 7 Drawing Sheets

(51) Int. Cl.
*H04N 21/433* (2011.01)
*H04N 21/81* (2011.01)
*H04N 21/845* (2011.01)

(56) References Cited

FOREIGN PATENT DOCUMENTS

| CN | 104702856 A | 6/2015 |
|---|---|---|
| CN | 104967900 A | 10/2015 |
| CN | 106231433 A | 12/2016 |
| CN | 106804005 A | 6/2017 |
| CN | 107750013 A | 3/2018 |
| CN | 108600825 A | 9/2018 |
| CN | 108900768 A | 11/2018 |
| CN | 108900902 A | 11/2018 |
| CN | 109005359 A | 12/2018 |
| CN | 109413342 A | 3/2019 |
| WO | 2013144670 A1 | 10/2013 |
| WO | 2018184488 A1 | 10/2018 |

OTHER PUBLICATIONS

Communication pursuant to Article 94(3) EPC of European application No. 19897846.2 dated Feb. 18, 2022.
International search report of PCT application No. PCT/CN2019/121454 dated Feb. 17, 2020.
First office action of Chinese application No. 201811575178.3 dated Mar. 30, 2020.
Notification to grant patent for invention of Chinese application No. 201811575178.3 dated Dec. 14, 2020.

* cited by examiner

AUDIO AND VIDEO PROCESSING METHOD AND APPARATUS, TERMINAL AND STORAGE MEDIUM

This application is a US national stage of international application No. PCT/CN2019/121454, filed on Nov. 28, 2019, which claims priority to Chinese Patent Application No. 201811575178.3, filed on Dec. 21, 2018 and entitled "AUDIO AND VIDEO PROCESSING METHOD AND APPARATUS, TERMINAL AND STORAGE MEDIUM", the entire content of which is incorporated herein by reference.

TECHNICAL FIELD

Embodiments of the present disclosure relate to the field of multimedia technologies, and in particular, to an audio and video processing method and apparatus, a terminal and a storage medium.

BACKGROUND

The audio and video processing method includes a method for processing audios and/or videos.

In the related art, when a terminal plays a target audio, an audio play page of the target audio is displayed. The audio play page includes a music video (MV) entry. When the terminal detects a click signal acting on the MV entry, the terminal jumps from the current audio play page to an MV play page for display, and the MV corresponding to the audio is played from the beginning on the MV play page.

SUMMARY

In an aspect, an audio and video processing method is provided. The method is applicable to a terminal, and includes:

displaying a video creation interface of a target audio, wherein the video creation interface includes n audio clips of the target audio and video recording entries corresponding to the n audio clips respectively, wherein n≥2;

receiving a trigger signal acting on a target video recording entry on the video creation interface, wherein the target video recording entry is a video recording entry corresponding to a target audio clip;

acquiring a target video corresponding to the target audio clip based on the trigger signal, wherein the target video is a video clip of which the video duration is less than a duration threshold; and sending a video creation request carrying the target video to a server, wherein the video creation request is used to instruct to play picture information of the target video when the target audio is played.

In another aspect of the embodiments of the present disclosure, an audio and video processing apparatus is provided. The apparatus is applicable to a terminal, and includes:

a displaying module, configured to display a video creation interface of a target audio, wherein the video creation interface includes n audio clips of the target audio and video recording entries corresponding to the n audio clips respectively, wherein n≥2;

a receiving module, configured to receive a trigger signal acting on a target video recording entry on the video creation interface, wherein the target video recording entry is a video recording entry corresponding to a target audio clip;

an acquiring module, configured to acquire the target video corresponding to the target audio clip based on the trigger signal, wherein the target video is a video clip of which the video duration is less than a duration threshold; and a sending module, configured to send a video creation request carrying the target video to a server, wherein the video creation request is used to instruct to play picture information of the target video when the target audio is played.

In still another aspect of the embodiments of the present disclosure, a terminal is provided. The terminal includes a processor and a memory. The memory stores at least one instruction that, when executed by the processor, causes the processor to implement any of the audio and video processing methods described the above embodiments of the present disclosure.

In still another aspect of the embodiments of the present disclosure, a computer-readable storage medium is provided. The storage medium stores at least one instruction that, when executed by a processor, causes the processor implement any of the audio and video processing methods described in the above embodiments of the present disclosure.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
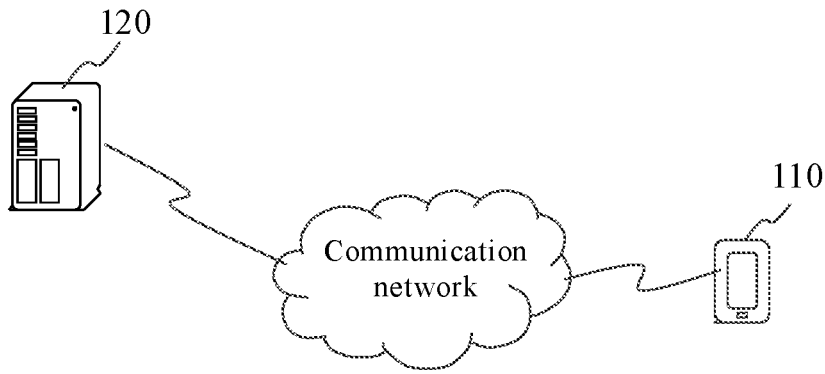
FIG. 1 is a schematic structural diagram of a terminal according to an exemplary embodiment of the present disclosure.

For clearer descriptions of the objectives, technical solutions, and advantages of the present disclosure, the embodiments of the present disclosure are described in detail hereinafter with reference to the accompanying drawings.

The term "a plurality of" mentioned herein refers to two or more, and the term "and/or" describes an association relationship of associated objects, indicating that there may be three relationships. For example, A and/or B may represent three circumstances: A exists alone, A and B exist concurrently, and B exists alone. The character "/" generally indicates that the associated objects are in an "or" relationship.

Before illustrating the embodiments of the present disclosure, the application scenario of the embodiments of the present disclosure is described first. An audio and video processing system includes a terminal 110 and a server 120.

The terminal 110 is an electronic device with a video uploading function. Optionally, the terminal 110 is configured to upload a target video to the server 120. For example, the terminal 110 may be a mobile phone, a tablet computer, a laptop portable computer, a desktop computer, and so on.

Optionally, the terminal 110 is an electronic device with a video recording function. The terminal 110 is configured to record a target video by an image capture component (for example, a camera) and an audio capture component (for example, a microphone), and upload the recorded target video to the server 120.

Optionally, an audio application runs in the terminal 110, and the terminal 110 is configured to display a video creation interface of a target audio in the audio application. The video creation interface includes a plurality of audio clips of the target audio and video recording entries corresponding to the plurality of audio clips, respectively. The terminal is configured to receive a trigger signal acting on the target video recording entry corresponding to the target audio clip, on the video creation interface, acquire the target video corresponding to the target audio clip based on the trigger signal, and send a video creation request carrying the target video to the server 120.

Illustratively, the audio application is a music play application.

The terminal 110 and the server 120 are connected via a communication network. Optionally, the communication network is a wired network or a wireless network.

The server 120 is a server, or a server cluster including several servers, or a virtualization platform, or a cloud computing service center.

Optionally, the server 120 includes a background server providing an audio and video processing service. Optionally, the server is a background server corresponding to the audio application.

The server 120 and the terminal 110 are connected via a communication network. Optionally, the communication network is a wired network or a wireless network.

The server 120 is configured to receive the video creation request sent by the terminal 110, acquire the target video from the video creation request, and store the target video.

Optionally, the terminal 110 is an electronic device with a video playing function. The terminal 110 is further configured to send an audio play request of the target audio to the server 120, and play, based on a picture play instruction fed back by the server 120, picture information of the target video through the audio application during play of the target audio.

It should be noted that the above terminal uploading the video and the terminal playing the audio may be the same terminal or two different terminals, which is not limited in the embodiments of the present disclosure. For the convenience of illustration, the case that the terminal uploading the video and the terminal playing the audio are the same terminal, that is, the terminal in the embodiments of the present disclosure has both a video uploading function and a video playing function is taken as an example for illustration.

Figure 2:
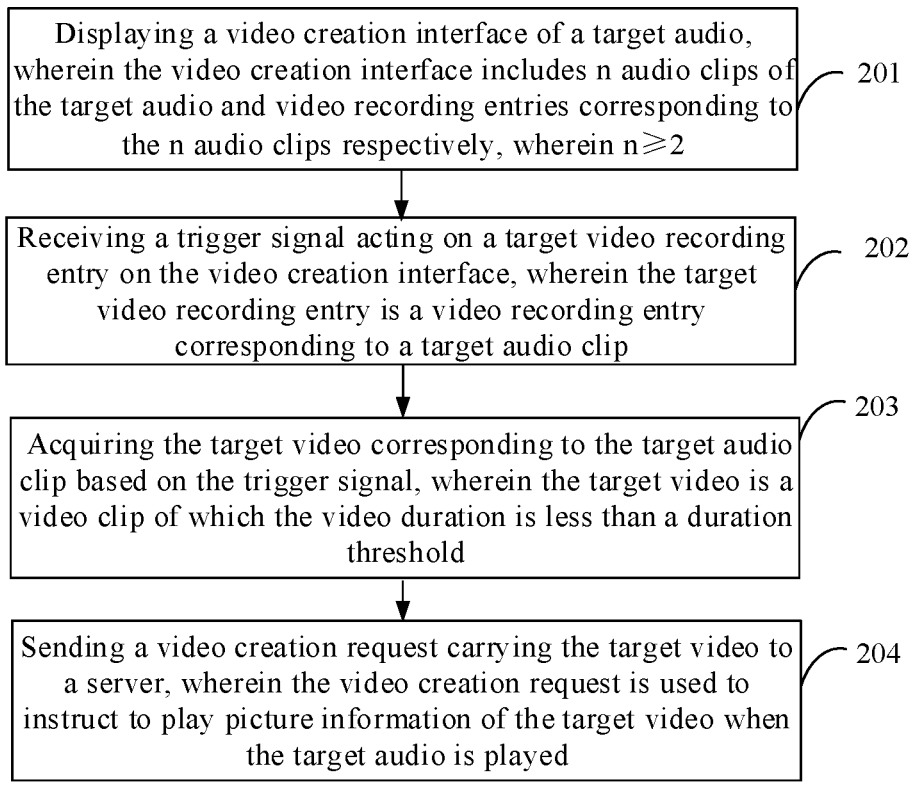
FIG. 2 is a flowchart of an audio and video processing method according to an exemplary embodiment of the present disclosure.

Please refer to FIG. 2, which shows a flowchart of an audio and video processing method according to an exemplary embodiment of the present disclosure. In the present embodiment is illustrated by taking an example in which the audio and video processing method is applied to the terminal shown in FIG. 1. The audio and video processing method includes the following steps.

In step 201, a video creation interface of a target audio is displayed, wherein the video creation interface includes n audio clips of the target audio and video recording entries corresponding to the n audio clips respectively, wherein When the audio application is running in the foreground, the terminal displays the video creation interface of the target audio by means of the audio application.

Optionally, the video creation interface of the target audio is an interface configured to create a corresponding target video for at least one audio clip in the target audio.

The video creation interface includes n audio clips of the target audio and the video recording entries corresponding to the respective n audio clips. Optionally, the n audio clips may be n audio clips constituting a complete target audio, or may be n audio clips constituting part of the target audio. The video recording entry corresponding to each audio clip may be directly displayed on the video creation interface, or may be displayed on an audio clip when the terminal receives a selected signal acting on the audio clip on the video creation interface.

Optionally, the video recording entry is an operable control configured to trigger to acquire the target video corresponding to the target audio clip. Illustratively, the type of the video recording entry includes at least one of a button, an operable item, and a slider. The location and type of the video recording entry are not limited in the present embodiment.

Optionally, the terminal plays the target audio by means of the audio application. The target audio includes a plurality of audio clips. The play durations respectively corresponding to at least two audio clips of the plurality of audio clips are different, or the play durations corresponding to the respective audio clips are the same. For example, the play duration corresponding to each audio clip in the plurality of audio clips is 30 seconds.

Optionally, before the terminal displays the video creation interface of the target audio, the server performs clipping processing on the target audio in advance. In order to ensure the integrity of lyrics in the plurality of audio clips acquired by the clipping processing, the server performs the clipping processing on the target audio based on beat features of the target audio to acquire the plurality of audio clips.

The beat features are used to indicate the number of beats per minute (BPM) corresponding to a video.

In step 202, a trigger signal acting on a target video recording entry is received on the video creation interface, wherein the target video recording entry is a video recording entry corresponding to a target audio clip.

In a possible implementation, when the terminal receives a selected signal acting on an audio clip on the video creation interface, the audio clip is determined as the target audio clip. When the terminal receives the trigger signal acting on the target video recording entry on the target audio clip, the following step 203 is executed.

The trigger signal is configured to trigger a user operation to acquire the target video corresponding to the target audio clip. Illustratively, the trigger signal includes any one or a combination of a click operation signal, a slide operation signal, a press operation signal, and a long press operation signal.

Optionally, the trigger signal further includes other possible implementations. For example, the trigger signal is implemented in the form of voice, or the trigger signal is implemented in the form of a shake-and-shake operation. The shake-and-shake operation refers to an operation of shaking the terminal.

In step 203, the target video corresponding to the target audio clip is acquired based on the trigger signal, wherein the target video is a video clip of which the video duration is less than a duration threshold.

Optionally, acquiring, by the terminal, the target video corresponding to the target audio clip may be implemented as acquiring, by the terminal, the target video corresponding to each of at least two target audio clips.

Optionally, the target audio clip is one or more audio clips of the plurality of audio clips of the target audio, and the target video corresponding to one target audio clip includes one or more target videos corresponding to one target audio clip. The number of the target audio clips and target videos is not limited in the embodiments of the present disclosure.

The target video is a video clip of which the video duration is less than the duration threshold. Optionally, the target video is a video recorded or uploaded by the terminal. For example, the duration threshold is 15 seconds, 20 seconds, or 1 minute. The video is original.

Optionally, the target video is a short video, which is a mode of broadcasting Internet content. The target video includes picture information and audio information. The target video is a video of which the picture information and/or audio information is original content and the video duration is less than the duration threshold. Illustratively, the target video is a video of which the picture information is recorded by a user and the duration of the audio information is less than the duration threshold. Illustratively, the target video is a video of which both the picture information and audio information is recorded by a user and the video duration is less than the duration threshold.

In step 204, a video creation request carrying the target video is sent to the server, wherein the video creation request is used to instruct to play the picture information of the target video when the target audio is played.

The terminal generates the video creation request based on the target video corresponding to the target audio clip, and the video creation request carries the target video. The terminal sends the video creation request to the server. Correspondingly, the server receives the video creation request, acquires the target video from the video creation request, and stores the target video.

Optionally, when playing the target audio by the audio application, the terminal acquires the picture information of the target video corresponding to the target audio from the server, and plays the picture information of the target video when the target audio is played. At this point, the audio information of the target video is not played.

In summary, in the present embodiment, by displaying the video creation interface of the target audio, the trigger signal acting on the video recording entry corresponding to the target audio clip is received on the video creation interface, the target video corresponding to the target audio clip is acquired based on the trigger signal, and the video creation request carrying the target video is sent to the server.

Therefore, the terminal can upload the corresponding video for one or more audio clips in one audio, such that the picture information of the video corresponding to the audio clip can be synchronously played during the subsequent play of the audio, thereby avoiding the problem of poor play effect of the audio and video caused by the fact that an MV corresponding to the audio is unchangeable in the related art, and improving the play effect of the audio and video.

Figure 3:
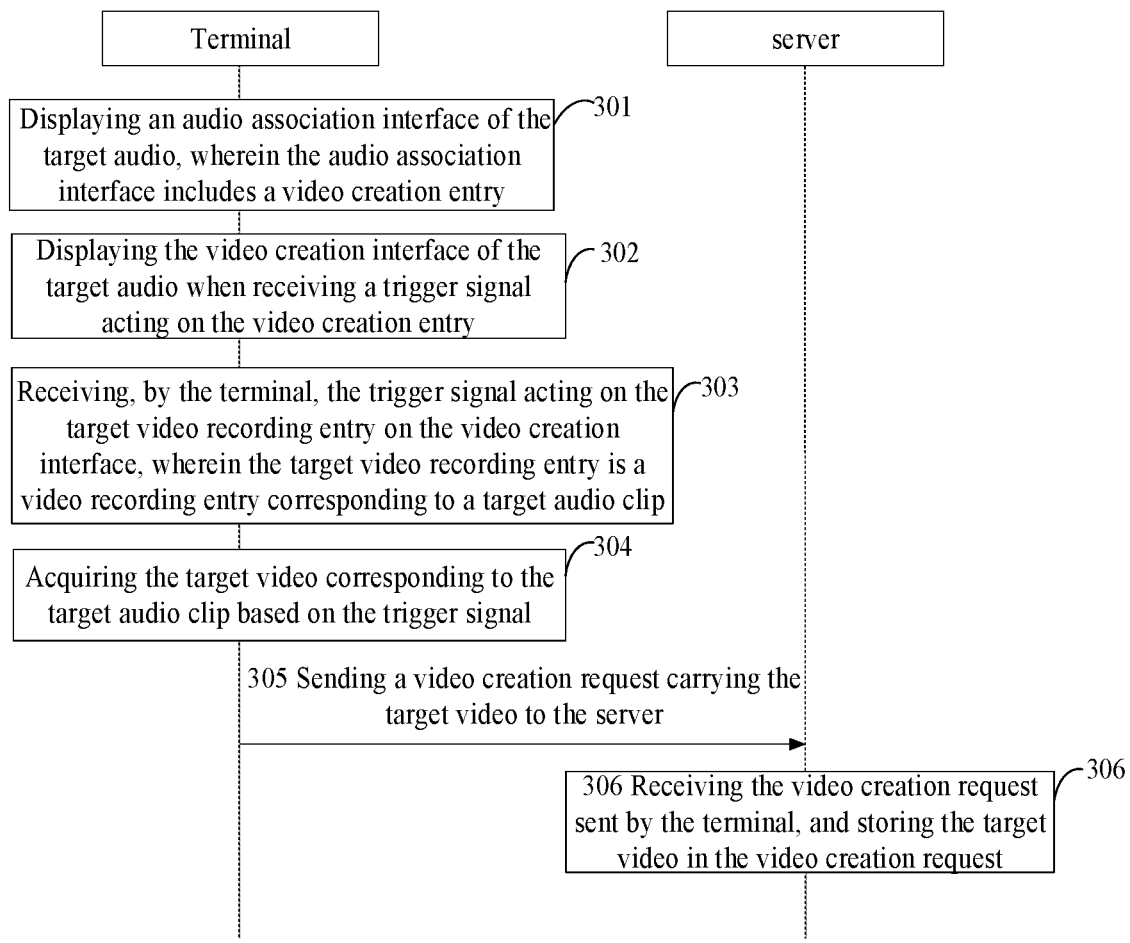
FIG. 3 is a flowchart of an audio and video processing method according to another exemplary embodiment of the present disclosure.

Please refer to FIG. 3, which shows a flowchart of an audio and video processing method according to another exemplary embodiment of the present disclosure. The present embodiment is illustrated by taking an example in which the audio and video processing method is applied to the terminal shown in FIG. 1. The audio and video processing method includes the following steps.

In step 301, the terminal displays an audio association interface of the target audio, wherein the audio association interface includes a video creation entry.

Optionally, the audio association interface is an interface associated with the process of playing the target audio. Illustratively, the audio association interface of the target audio is an audio playing interface of the target audio.

The video creation entry is an entry provided in the audio application. The video creation entry is an operable control configured to trigger display of the video creation interface. Illustratively, the type of the video creation entry includes at least one of a button, an operable item, and a slider. The location and type of the video creation entry are not limited in present embodiment.

In step 302, when receiving a trigger signal acting on the video creation entry, the terminal displays the video creation interface of the target audio.

When receiving the trigger signal corresponding to the video creation entry on the audio association interface, the terminal displays the video creation interface of the target audio.

The trigger signal is used to trigger a user operation to display the video creation interface of the target audio. Illustratively, the trigger signal includes any one or a combination of a click operation signal, a slide operation signal, a press operation signals, and a long press operation signal.

The video creation interface of the target audio includes a plurality of audio clips of the target audio and the video recording entries corresponding to the plurality of audio clips, respectively.

In step 303, the terminal receives the trigger signal acting on a target video recording entry on the video creation interface, wherein the target video recording entry is a video recording entry corresponding to the target audio clip.

It should be noted that for the process that the terminal receives the trigger signal acting on the target video recording entry on the video creation interface, reference may be made to the relevant details in the above embodiment, and the process is not repeated herein.

In step 304, the terminal acquires the target video corresponding to the target audio clip based on the trigger signal.

The target video is a video clip of which the video duration is less than a duration threshold.

Acquiring, by the terminal, the target video corresponding to the target audio clip based on the trigger signal includes, but is not limited to, the following possible implementations.

In a possible implementation, the terminal enables the video recording function based on the trigger signal, and performs video recording to acquire the target video.

Optionally, after the video recording function is enabled, the terminal captures images based on a preset sampling frequency. The terminal, upon detection of a stop operation signal corresponding to a stop control, ends the video recording function. Meanwhile, the captured frames of images are encoded and synthesized to acquire the target video.

The stop control may be implemented as a control displayed on the screen of the terminal during video recording, or may be implemented as a physical button on the terminal. The stop control is an operable control configured to end the video recording function. Illustratively, when the stop control is implemented as the control displayed on the screen, the type of the stop control includes at least one of a button, an operable item, and a slider. The location and type of the stop control are not limited in the present disclosure.

The stop operation signal is a user operation signal configured to trigger an end of the video recording function corresponding to the stop control. Illustratively, the stop operation signal includes any one or a combination of a click operation signal, a slide operation signal, a press operation signals, and a long press operation signal.

Optionally, the stop operation further includes other possible implementations. For example, the stop operation is implemented in the form of voice, or the stop operation is implemented in the form of a shake-and-shake operation. The shake-and-shake operation refers to an operation of shaking the terminal.

In another possible implementation, the terminal acquires the target video stored in the terminal based on the trigger signal.

Optionally, a recorded or downloaded target video is stored in the terminal. The terminal acquires the target video stored in the terminal based on the trigger signal.

In another possible implementation, the terminal sends a video acquisition request to the server based on the trigger signal. The video acquisition request carries a clip identifier of the target audio clip, and the video acquisition request is used to instruct the server to feed back at least video corresponding to the clip identifier. Then, the terminal determines the target video from the received at least one video fed back by the server.

The terminal sends the video acquisition request to the server based on the trigger signal. Correspondingly, the server receives the video acquisition request, acquires the clip identifier of the target audio clip from the video acquisition request, acquires a plurality of videos corresponding to the clip identifier based on a first corresponding relationship and feeds back the plurality of videos corresponding to the clip identifier to the terminal. Correspondingly, the terminal receives the plurality of videos fed back by the server, and determines the target video from the plurality of videos.

The server stores the corresponding relationship between the clip identifiers of the plurality of audio clips of the target audio and the plurality of videos. In the plurality of audio clips, the clip identifier of at least one audio clip corresponds to a plurality of videos.

Determining, by the terminal, the target video from the plurality of videos includes: randomly determining, by the terminal, a target video from the plurality of videos; and determining, by the terminal, the target video from the plurality of videos based on video information. The video information includes at least one of the number of giving a like to the video, the update time of the video, and the creation time of the video.

It should be noted that the target video is a video recorded and uploaded by the terminal after receiving the trigger signal acting on the video recording entry corresponding to the target audio clip, or a stored video uploaded by the terminal upon receiving the trigger signal acting on the video recording entry corresponding to the target audio clip, or a video determined by the terminal from the plurality of videos fed back by the server when the terminal receives the trigger signal acting on the video recording entry corresponding to the target audio clip. The manner of acquiring the target video is not limited in the present embodiment.

In step 305, the terminal sends the video creation request carrying the target video to the server.

The video creation request is used to instruct to play the picture information of the target video when the target audio is played.

Optionally, the target audio clip may further be implemented as at least two target audio clips, and the at least two target audio clips correspond to respective target videos. The at least two target audio clips are at least two consecutive audio clips in the target audio.

Optionally, sending, by the terminal, the video creation request carrying the target video to the server includes: splicing, by the terminal, the picture information respectively corresponding to the at least two target videos to acquire a first video spliced picture, and sending a first video creation request carrying the first video spliced picture to the server. The first video creation request is used to instruct to play the first video spliced picture when the target audio is played.

Optionally, before the terminal splices the picture information respectively corresponding to the at least two target videos to acquire the first video spliced picture, the method further includes: clipping the target video of which the play duration is longer than the play duration of the corresponding target audio clip.

When a first play duration of a target video is longer than the play duration of the corresponding target audio clip, the terminal clips the target video having the first play duration to the target video having a second play duration.

Illustratively, when the first play duration of a target video is longer than the play duration of the corresponding target audio clip, the server determines the absolute value of a difference between the first play duration of the target video and the play duration of the corresponding target audio clip. The server clips a video head or a video tail of the target video into a clip with the play duration of the absolute value of the difference, to acquire the target video with the second play duration.

For example, the play duration of the target video is 40 seconds, the play duration of the corresponding audio clip is 30 seconds, and the server determines that the absolute value of the difference is 10, and clips off 10 seconds from the play duration of the target video, to acquire the target video with the play duration of 30 seconds.

In step 306, the server receives the video creation request sent by the terminal, and stores the target video in the video creation request.

Optionally, the server receives the first video creation request sent by the terminal, acquires the first video spliced picture from the first video creation request, and stores the first video spliced picture.

Optionally, the server stores a fourth corresponding relationship between the audio identifier of the target audio and the first video spliced picture, and the audio identifier is configured to uniquely identify the target audio in the plurality of audios.

Figure 4:
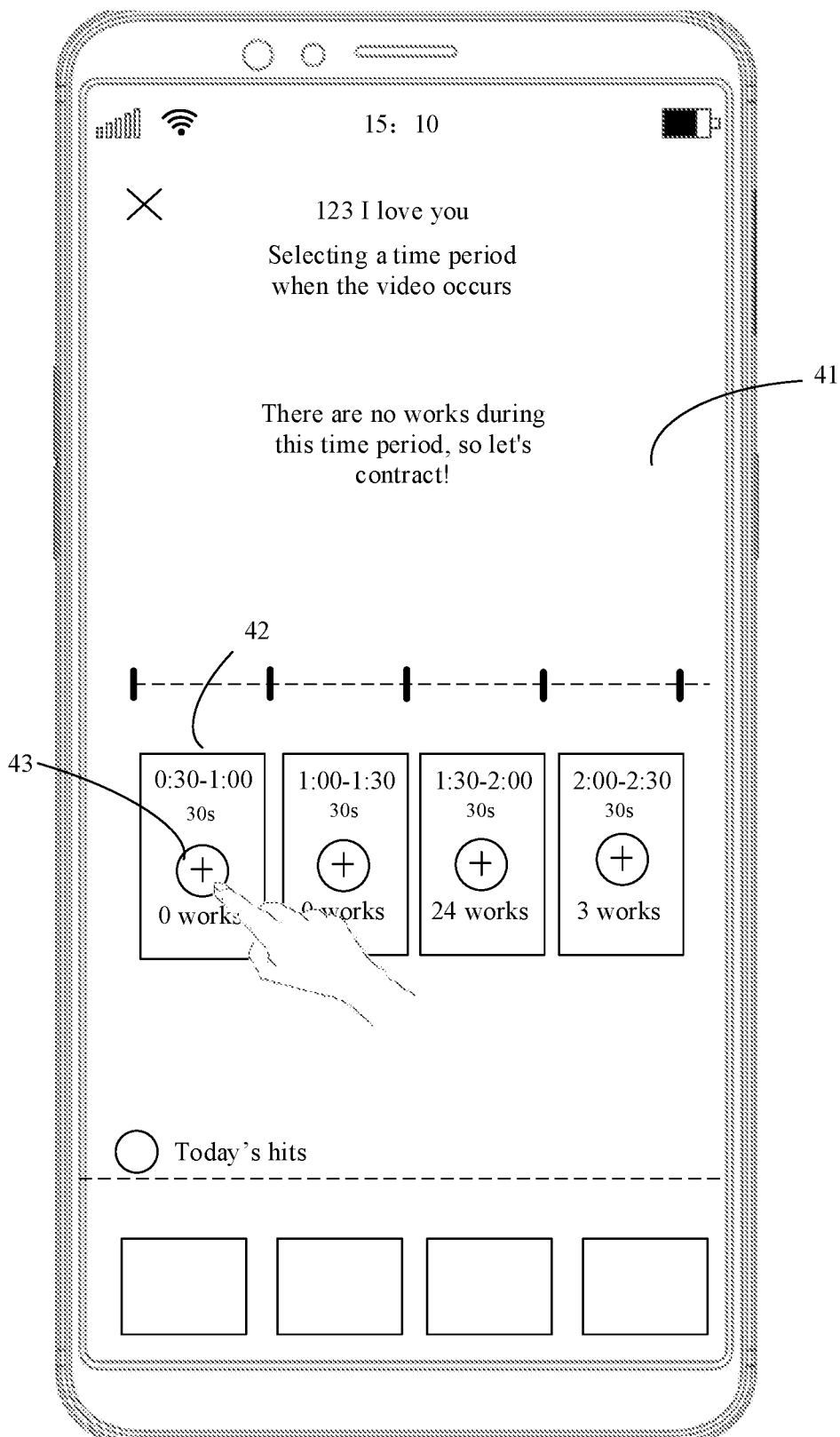
FIG. 4 is a schematic diagram of an interface involved in an audio and video processing method according to another exemplary embodiment of the present disclosure.

In an example, as shown in FIG. 4, the terminal displays the video creation interface 41 of the target audio, and the video creation interface 41 includes a plurality of audio clips of the target audio "123 I love you". When the terminal receives a click signal acting on the video recording entry 43 corresponding to the target audio clip 42 on the video creation interface 41, the terminal enables the video recording function, and performs video recording to acquire the target video corresponding to the target audio clip 42. The terminal sends the video creation request carrying the target video to the server.

Figure 5:
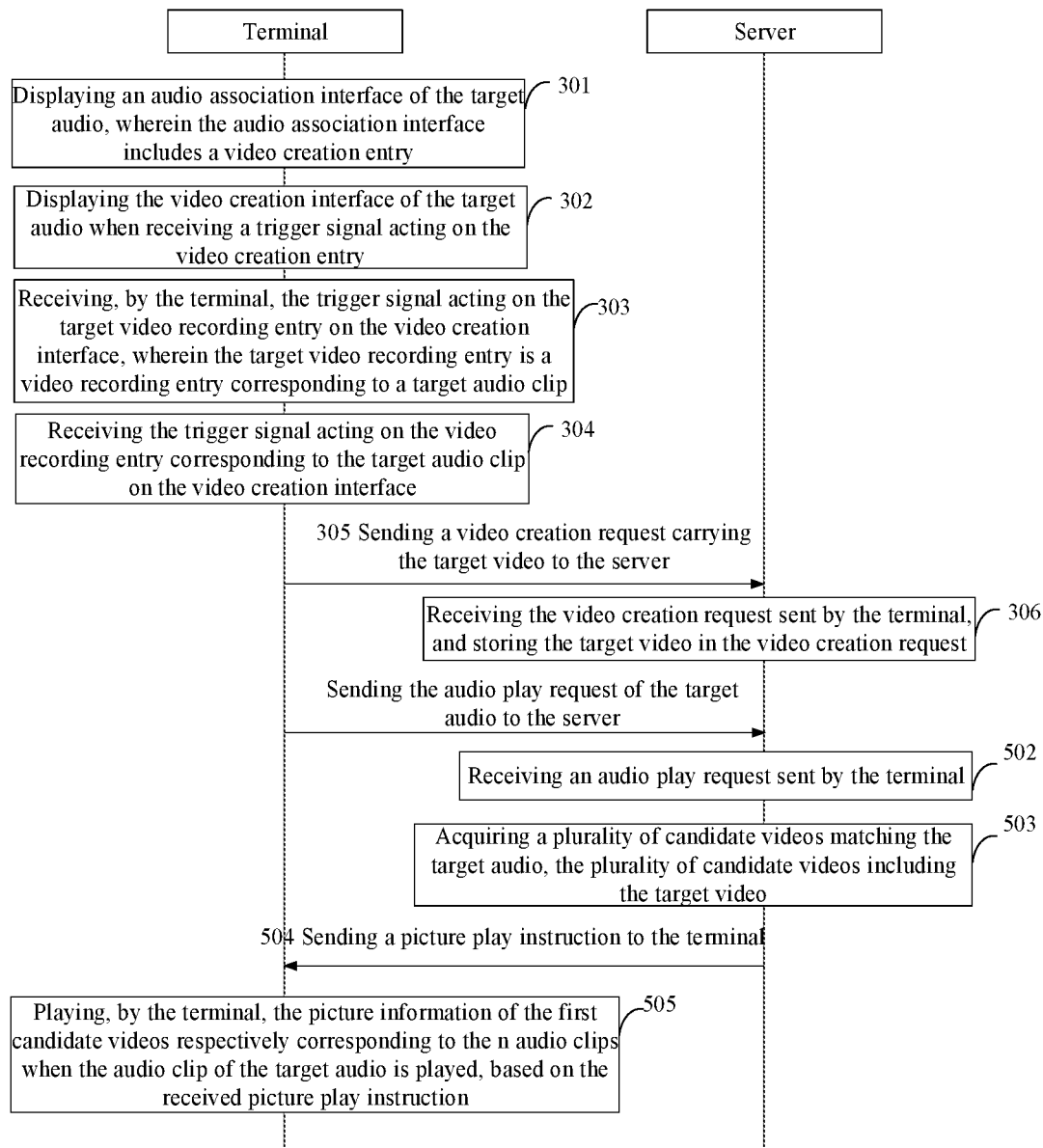
FIG. 5 is a flowchart of an audio and video processing method according to still another exemplary embodiment of the present disclosure.

Optionally, as shown in FIG. 5, after step 306, the method includes, but is not limited to, the following steps.

In step 501, the terminal sends an audio play request of the target audio to the server.

The audio play request is used to instruct the server to acquire first candidate videos corresponding to the n audio clips respectively and feed back a picture play instruction, and send the picture play instruction to the terminal. The first candidate video includes the target video.

Optionally, the audio play request carries the audio identifier of the target audio. The audio identifier of the target audio is configured to uniquely indicate the target audio.

In step 502, the server receives the audio play request sent by the terminal.

Correspondingly, the server receives the audio play request sent by the terminal, and acquires the audio identifier of the target audio from the audio play request.

In step 503, the server acquires a plurality of candidate videos matching the target audio, and the plurality of candidate videos include the target video.

Optionally, acquiring, by the server, the plurality of candidate videos matching the target audio includes, but is not limited to, the following possible implementations.

In a possible implementation, the server acquires an audio tag of the target audio, the audio tag being used to indicate the type of the target audio; acquires a target video classification group corresponding to the audio tag based on a second corresponding relationship, the second corresponding relationship including a corresponding relationship between the audio tag and the video classification group; and acquires a plurality of candidate videos from the target video classification group.

It should be noted that the videos (including the target video and the candidate video) involved in the embodiments of the present disclosure are all short videos, and the short video is a video clip of which the video duration is less than the duration threshold.

The audio tag of the target audio may be determined by the server based on the audio content of the target audio, or may be carried in the audio play request sent by the terminal and received by the server, which is not limited in the present embodiment.

The audio tag is used to uniquely indicate the audio type of the audio. In a possible implementation, the audios are classified based on different audio materials. For example, the audio type includes at least one of a scenery type, a dance type, and a singing type. In another possible implementation, the audios are classified based on different audio rhythms. For example, the audio type includes a fast-tempo type and a slow-tempo type. The manner of audio classification is not limited in the present disclosure.

It should be noted that the manner of audio classification may be the same as or different from the manner of video classification in the embodiments of the present disclosure. For the convenience of introduction, the following only takes the case that the manner of audio classification and the manner of video classification are the same, that is, the audio type and the video type both include the scenery type, the dance type, and the singing type as an example for illustration.

Illustratively, the corresponding relationship between the audio tag and the video classification group is as shown in Table 1. The audio tag includes a scenery tag, a dance tag, and a singing tag. The target video classification group matching the scenery tag is a first video classification group. The first video classification group includes a plurality of videos with a scenery identifier. The target video classification group matching the dance tag is a second video classification group, and the second video classification group includes a plurality of videos with a dance identifier. The target video classification group matching the singing tag is a third video classification group, and the third video classification group includes a plurality of videos with a singing identifier.

TABLE 1

| Audio tag | Video classification group |
| --- | --- |
| Scenery identifier | First video classification group |
| Dance identifier | Second video classification group |
| Singing identifier | Third video classification group |

Optionally, the server randomly acquires a plurality of candidate videos from the target video classification group, and a third play duration sum of the plurality of candidate videos is less than or equal to the play duration of the target audio.

In another possible implementation, acquiring, by the server, the plurality of candidate videos matching the target audio includes: acquiring, by the server, the first candidate videos corresponding to the n audio clips respectively, and the first candidate videos including the target video.

Optionally, the server acquires the first candidate videos corresponding to the plurality of audio clips respectively from a video library based on a third corresponding relationship, and the third corresponding relationship includes a corresponding relationship between the audio clip and the first candidate video.

Optionally, candidate video sets respectively corresponding to the plurality of audio clips of the target audio are stored in the server. The candidate video set corresponding to each audio clip includes at least one candidate video. The first candidate video corresponding to the audio clip is any one candidate video in the candidate video set corresponding to the audio clip.

Illustratively, the target audio is song "AA", the song "AA" includes 5 audio clips, each audio clip has a play duration of 30 seconds, and the corresponding relationship between the 5 audio clips and the plurality of candidate video sets is as shown in Table 2. The first candidate video set corresponding to clip 1 includes "video S001, video S025, video S067, video S091, video S101, video S134, and video S175". The second candidate video set corresponding to clip 2 includes "video S010 and video S106". The third candidate video set corresponding to clip 3 includes "video S003, video S012, video S050, video S079, and video S111". The fourth candidate video set corresponding to clip 4 includes "video S007 and video S088". The fifth candidate video set corresponding to clip 5 includes "video S008, video S053, video S099, video S190 and video S351".

TABLE 2

| Audio clip | Candidate video set |
| --- | --- |
| Clip 1 | Video S001, video S025, video S067, video S091, video S101, video S134, video S175 |
| Clip 2 | Video S010, video S106 |
| Clip 3 | Video S003, video S012, video S050, video S079, video S111 |

TABLE 2-continued

| Audio clip | Candidate video set |
| --- | --- |
| Clip 4 | Video S007, video S088 |
| Clip 5 | Video S008, video S053, video S099, video S190, video S351 |

In another possible implementation, the server acquires the audio identifier of the target audio, and acquires the first video spliced picture corresponding to the audio identifier based on the fourth corresponding relationship.

In step 504, the server sends a picture play instruction to the terminal.

The picture play instruction is used to instruct the audio application to play the picture information corresponding to each of the plurality of candidate videos when the target audio is played.

Optionally, sending, by the server, the picture play instruction to the terminal includes, but is not limited to, the following possible implementations.

In a possible implementation, when the server acquires the picture information corresponding to each of the plurality of candidate videos, and the third play duration sum of the plurality of candidate videos is less than or equal to the play duration of the target audio, the server sends a first picture play instruction to the terminal. The first picture play instruction is used to instruct to sequentially play the picture information respectively corresponding to the plurality of candidate videos in the process of playing the target audio.

In another possible implementation, when the server acquires the picture information corresponding to each of the plurality of candidate videos, and the third play duration sum of the plurality of candidate videos is greater than the play duration of the target audio, the server clips the plurality of candidate videos having the third play duration sum to the plurality of candidate videos having a fourth play duration sum, and sends a second picture play instruction to the terminal.

When the third play duration sum of the plurality of candidate videos is greater than the play duration of the target audio, the server firstly clips the plurality of candidate videos, that is, the server clips the plurality of candidate videos having the third play duration sum to the plurality of candidate videos having the fourth play duration sum. The fourth play duration sum is less than or equal to the play duration of the target audio.

Optionally, the server determines the absolute value of a difference between the third play duration sum of the plurality of candidate videos and the play duration of the target audio, and the server clips one or more candidate videos of the plurality of candidate videos into clips with a play duration of the absolute value of the difference, to acquire the plurality of candidate videos with the fourth play duration sum.

Optionally, the second picture play instruction is used to instruct to sequentially play the picture information respectively corresponding to the plurality of candidate videos with the fourth play duration sum in the process of playing the target audio.

In another possible implementation, when the server acquires the picture information respectively corresponding to the plurality of candidate videos, and the third play duration sum of the plurality of candidate videos is greater than the play duration of the target audio, the server sends a third picture play instruction to the terminal. The third picture play instruction is used to instruct to sequentially play the picture information respectively corresponding to the plurality of candidate videos in the process of playing the target audio, and stop playing the picture information when play of the target audio ends.

Since the third play duration sum of the plurality of candidate videos is greater than the play duration of the target audio, that is, play of the picture information continues when play of the target audio ends, the server may instruct to stop playing the picture information when the play of the target audio ends.

In another possible implementation, when the server acquires the first candidate videos respectively corresponding to the plurality of audio clips, sending, by the server, the picture play instruction to the terminal includes: sending a fourth picture play instruction to the terminal. The fourth picture play instruction is used to instruct the audio application to play the picture information respectively corresponding to the plurality first candidate videos when the target audio is played.

Optionally, the server sends the fourth picture play instruction to the terminal, and the fourth picture play instruction is further used to instruct to sequentially play the picture information respectively corresponding to the plurality of first candidate videos when the target audio is played.

In another possible implementation, when the server acquires a well-spliced first video spliced picture, the server sends a fifth picture play instruction to the terminal, and the fifth picture play instruction is used to instruct to play the first video spliced picture during play of the target video.

In step 505, the terminal plays, based on the received picture play instruction, the picture information of the first candidate videos respectively corresponding to the n audio clips when the audio clips of the target audio are played.

Optionally, when the terminal receives the first picture play instruction, the terminal sequentially plays, by means of the audio application, the picture information respectively corresponding to the n candidate videos in the process of playing the target audio.

Optionally, when the terminal receives the second picture play instruction, the terminal sequentially plays, by means of the audio application, the picture information respectively corresponding to the plurality of candidate videos with the fourth play duration sum in the process of playing the target audio.

Optionally, when the terminal receives the third picture play instruction, the terminal sequentially plays, by means of the audio application, the picture information respectively corresponding to the plurality of candidate videos in the process of playing the target audio, and stops playing the picture information when play of the target audio ends.

Optionally, when the terminal receives the fourth picture play instruction, the terminal plays, by means of the audio application, the picture information respectively corresponding to the plurality of first candidate videos when the target audio is played.

Optionally, when the terminal receives the fifth picture play instruction, the terminal plays, by means of the audio application, the first video spliced picture when the target audio is played.

A user may dislike the picture information corresponding to a certain audio clip in the process of playing the target video by the terminal. Thus, the user can switch and play other picture information by a picture switch operation. In a possible implementation, when receiving a picture switch operation signal acting on the first audio clip, the terminal acquires a current first play time point of the target audio;

and sends a picture switch request to the server. The picture switch request carries the audio identifier of the target audio, and is used to instruct the server to acquire a second video spliced picture corresponding to the audio identifier, and send a first picture switch instruction to the terminal. Based on the received first picture switch instruction, the terminal starts to switch and play the second video spliced picture at the first play time point of the target audio.

The first play time point is a play time point of the target audio when the terminal receives the picture switch operation signal acting on the first audio clip.

Optionally, the terminal sends a picture switch request to the server. Correspondingly, the server receives the picture switch request, acquires the audio identifier from the picture switch request, and acquires the second video spliced picture corresponding to the audio identifier. The server feeds back the first picture switch instruction to the terminal. The terminal receives the first picture switch instruction fed back by the server, and starts to switch and play the second video spliced picture at the first play time point of the target audio, based on the first picture switch instruction.

The second video spliced picture is different from the first video spliced picture.

Optionally, acquiring, by the terminal, the second video spliced picture corresponding to the audio identifier includes: acquiring, by the terminal, a candidate video spliced picture set corresponding to the audio identifier, and determining any one video spliced picture, except for the first video spliced picture, in the candidate video spliced picture set as the second video spliced picture.

Illustratively, when performing picture switching, the terminal does not need to play the target audio from the beginning, but continues playing the target audio. At the first play time point of the target audio, the terminal switch from play of the first video spliced picture to play of the second video spliced picture.

In a possible implementation, the picture switch request further carries the first play time point. The picture switch request is further used to instruct the server to acquire the second candidate video corresponding to the first audio clip at the first play time point in response to absence of the second video spliced picture corresponding to the audio identifier, and send a second picture switch instruction to the terminal.

Optionally, when there is no second video spliced picture corresponding to the audio identifier in the server, the server acquires the second candidate video corresponding to the first audio clip at the first play time point, and sends the second picture switch instruction to the terminal. The second picture switch instruction is used to instruct to start to switch and play the picture information of the second candidate video at the first play time point of the target audio in the process of playing the first audio clip.

Illustratively, acquiring, by the server, the second candidate video corresponding to the first audio clip at the first play time point includes: acquiring a candidate video set corresponding to the first target audio clip, and determining any one candidate video, except for the first candidate video, in the candidate video set as the second candidate video.

Optionally, the terminal starts to switch and play the picture information of the second candidate video at the first play time point of the target audio in the process of playing the first audio clip, based on the received second picture switch instruction.

Optionally, the play duration of the audio clip is the same as the play duration of the corresponding video, and the audio clip and the corresponding video are played synchronously. That is, there is a corresponding relationship between the play time point of the audio clip and the play time point of the video. Therefore, when the terminal receives the picture switch instruction sent by the server, the terminal determines a target play time point of the second candidate video corresponding to the target play time point of the target audio. The terminal switches to play the picture information of the second candidate video while continuing playing the first target audio clip by the audio application at the target play time point, and the picture information, which the terminal switches to play, of the second candidate video is the picture information starting from the target play time point of the second candidate video.

When playing at least one of the intro content, the interlude content, and the ending content of the target audio, the terminal does not need to play the picture information of the corresponding target video. Therefore, in a possible implementation, when playing specified time content of the target audio, the terminal switches from play of the picture information of the first candidate video to play of the video production information of the first candidate video. The first candidate video is a candidate video corresponding to the audio clip where the specified time content is. The specified time content includes at least one of the intro content, the interlude content, and the ending content. The video production information includes at least one of recorder information, uploader information, and splicer information which correspond to the first candidate video.

Illustratively, the recorder information is an identifier of the account recording the first candidate video, and the uploader information is an identifier of the account uploading the first candidate video to the server. When the picture information of the first candidate video is part of the well spliced video spliced picture, the splicer information is an identifier of the account splicing multiple pieces of picture information into the video spliced picture.

Optionally, the play duration of the audio clip is the same as the play duration of the corresponding candidate video, and the audio clip and the corresponding candidate video are played synchronously. That is, there is a corresponding relationship between the play time point of the audio clip and the play time point of the candidate video. Therefore, when the terminal receives the picture switch instruction sent by the server, the terminal determines the target play time point of the second candidate video corresponding to the target play time point of the target audio, and the terminal switches to play the picture information of the second candidate video while continuing playing the first target audio clip at the target play time point by the audio application. The picture information, which the terminal switches to play, of the second candidate video is the picture information starting from the target play time point of the second candidate video.

In summary, according to the embodiment of the present disclosure, the terminal splices the picture information respectively corresponding to the plurality of target videos to acquire the first video spliced picture, and sends the first video creation request carrying the first video spliced picture to the server. The first video creation request is used to instruct to play the first video spliced picture when the target audio is played. The terminal creates the well spliced video spliced picture for the target audio in advance, so that the well created video spliced picture can be directly played when the target audio is played subsequently. Therefore, the picture display during the play of the target audio is smoother, which further improves the play effect of the target audio.

According to the embodiment of the present disclosure, the server receives the audio play request sent by the terminal. The audio play request is used to request to play the target audio. The server acquires a plurality of candidate videos matching the target audio, and the plurality of candidate videos include the target video. The server sends a picture play instruction to the terminal, such that the terminal plays the picture information corresponding to the plurality of candidate videos based on the received picture play instruction, when the target audio is played by the audio application. Therefore, the technical effect that the target audio and the picture information of the plurality of candidate videos uploaded to the server are synchronously played is achieved.

According to the embodiment of the present disclosure, the current first play time point of the target audio is acquired when the picture switch operation signal acting on the first audio clip is received. The picture switch request is sent to the server. The picture switch request carries the audio identifier of the target audio. The picture switch request is used to instruct the server to acquire the second video spliced picture corresponding to the audio identifier. The first picture switch instruction is sent to the terminal. Based on the received first picture switch instruction, the terminal switches to play the second video spliced picture at the first play time point of the target audio. Therefore, play from the beginning after picture switch is avoided, so that the terminal can continue playing the switched second video spliced picture at the target play time point, which improves the play effect of the target audio.

The following is an apparatus embodiment of the present disclosure, which can be configured to execute the method embodiments of the present disclosure. For details that are not disclosed in the apparatus embodiment of the present disclosure, please refer to the method embodiments of the present disclosure.

Figure 6:
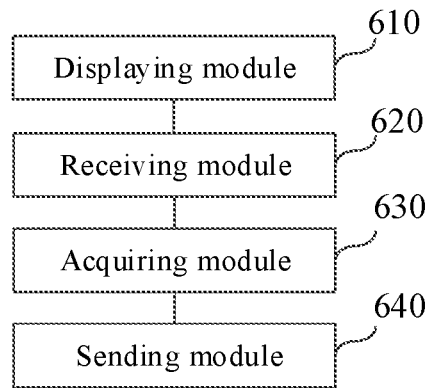
FIG. 6 is a schematic structural diagram of an audio and video processing apparatus according to an exemplary embodiment of the present disclosure.

Please refer to FIG. 6, which shows a schematic structural diagram of an audio and video processing apparatus according to an exemplary embodiment of the present disclosure. The audio and video processing apparatus may be implemented as all or part of the terminal in FIG. 1 by means of a dedicated hardware circuit, or a combination of software and hardware. The audio and video processing apparatus includes: a displaying module 610, a receiving module 620, an acquiring module 630, and a sending module 640.

The displaying module 610 is configured to display a video creation interface of a target audio. The video creation interface includes n audio clips of the target audio and video recording entries corresponding to the n audio clips respectively, wherein n≥2.

The receiving module 620 is configured to receive a trigger signal acting on a target video recording entry on the video creation interface. The target video recording entry is a video recording entry corresponding to a target audio clip.

The acquiring module 630 is configured to acquire the target video corresponding to the target audio clip based on the trigger signal. The target video is a video clip of which the video duration is less than a duration threshold.

The sending module 640 is configured to send a video creation request carrying the target video to a server. The video creation request is used to instruct to play picture information of the target video when the target audio is played.

Optionally, the acquiring module 630 is further configured to enable a video recording function based on the trigger signal, and perform video recording to acquire the target video; or, acquire the target video stored in the terminal based on the trigger signal; or, send a video acquisition request to the server based on the trigger signal, wherein the video acquisition request carries a clip identifier of the target audio clip, and the video acquisition request is used to instruct the server to feed back at least one video corresponding to the clip identifier; and determine the target video from the received at least one video fed back by the server.

Optionally, the displaying module 610 is further configured to display an audio association interface of the target audio, wherein the audio association interface includes a video creation entry; and display the video creation interface of the target audio when the trigger signal acting on the video creation entry is received.

Optionally, the target audio clip includes at least two target audio clips, and each of the at least two target audio clips corresponds to a target video.

Figure 7:
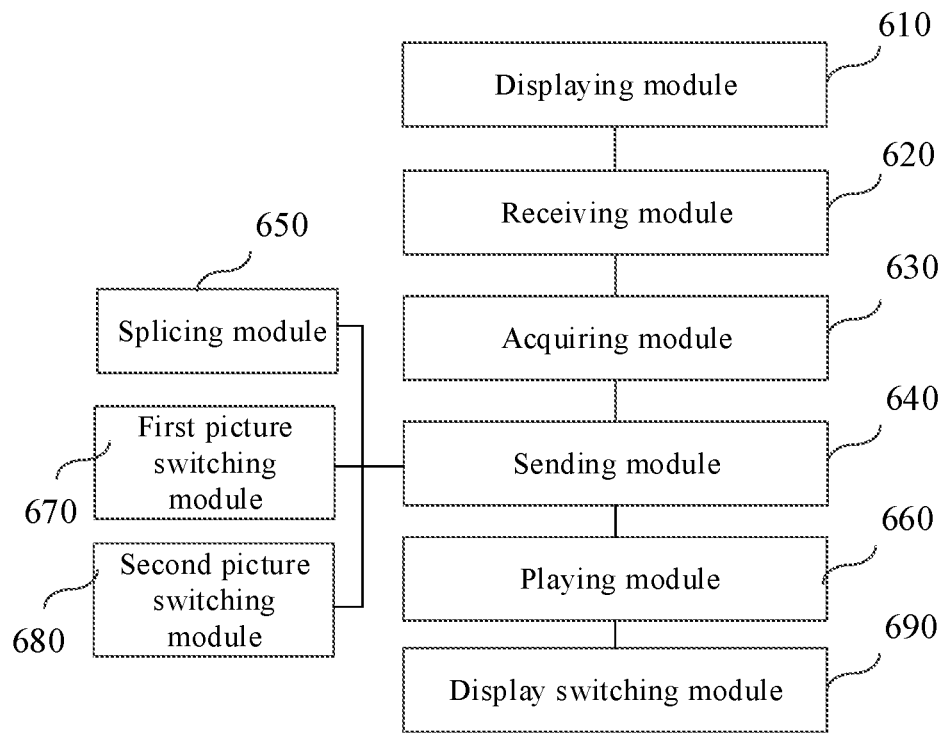
FIG. 7 is a schematic structural diagram of an audio and video processing apparatus according to another exemplary embodiment of the present disclosure.

As shown in FIG. 7, the apparatus further includes: a splicing module 650, configured to splice the picture information respectively corresponding to the plurality of target videos to acquire a first video spliced picture.

The sending module 640 is further configured to send a first video creation request carrying the first video spliced picture to the server. The first video creation request is configured to instruct to play the first video spliced picture when the target audio is played.

Optionally, the apparatus further includes: a playing module 660 configured to send an audio play request of the target audio to the server, wherein the audio play request is used to instruct the server to acquire first candidate videos corresponding to the n audio clips and feed back a picture play instruction, and the first candidate videos include the target video. The playing module 660 is configured to play, based on the received picture play instruction, the picture information of the first candidate video corresponding to each of the n audio clips when the audio clip of the target audio is played.

Optionally, the apparatus further includes:

a first picture switching module 670 configured to, when a picture switch operation signal acting on the first audio clip is received, acquire a current first play time point of the target audio;

send a picture switch request to the server, wherein the picture switch request carries an audio identifier of the target audio, and the picture switch request is used to instruct the server to acquire a second video spliced picture corresponding to the audio identifier, and send a first picture switch instruction to the terminal; and based on the received first picture switch instruction, start to switch and play the second video spliced picture at the first play time point of the target audio.

Optionally, the picture switch request further carries the first play time point, and the picture switch request is further used to instruct the server to acquire a second candidate video corresponding to the first audio clip at the first play time point when there is no second video spliced picture corresponding to the audio identifier, and send a second picture switch instruction to the terminal.

The apparatus further includes: a second picture switching module 680 configured to, based on the received second picture switch instruction, start to switch and play the picture information of the second candidate video at the first play time point of the target audio in the process of playing the first audio clip.

Optionally, the apparatus further includes: a display switching module 690 configured to, when specified time content of the target audio is played, switch from display of the picture information of the first candidate video to display of the video production information of the first candidate video. The first candidate video is a candidate video corresponding to the audio clip where the specified time content is, the specified time content includes at least one of intro content, interlude content, and ending content, and the video production information includes at least one of recorder information, uploader information, and splicer information which correspond to the first candidate video.

For related details, reference may be made to the method embodiments shown in FIG. 2 to FIG. 5. The displaying module 610 is further configured to implement any other implicit or disclosed functions related to the display steps in the above method embodiments. The receiving module 620 is further configured to implement any other implicit or disclosed functions related to the receiving steps in the above method embodiments. The acquiring module 630 is further configured to implement any other implicit or disclosed functions related to the acquisition steps in the above method embodiments. The sending module 640 is further configured to implement any other implicit or disclosed functions related to the sending steps in the above method embodiments.

It should be noted that the apparatus provided by the above embodiment only takes division of all the functional modules as an example for explanation when realizing its functions. In practice, the above functions can be completed by different functional modules as required. That is, the internal structure of the apparatus is divided into different functional modules to finish all or part of the functions described above. In addition, the apparatus according to the above embodiment has the same concept as the method according to the foregoing embodiments. The specific implementation process of the apparatus embodiment may be made reference to the method embodiments for details, which is not repeated herein.

Figure 8:
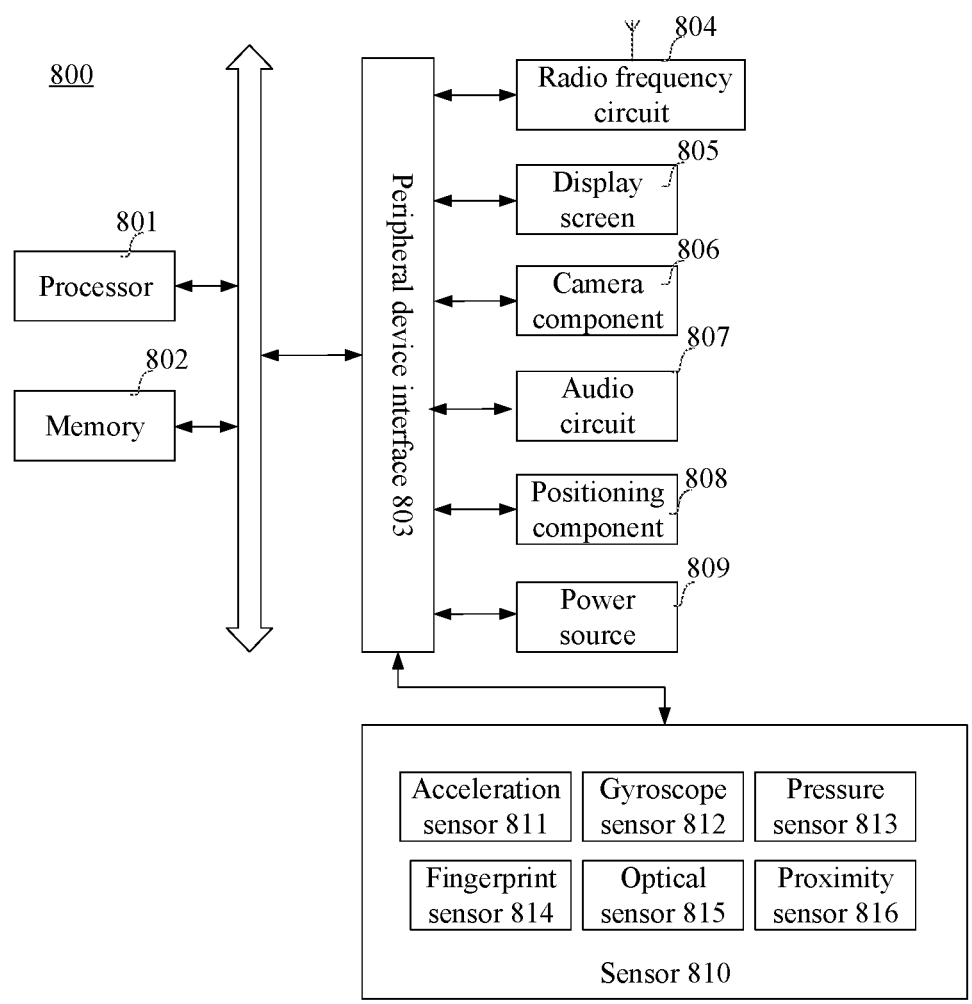
FIG. 8 is a structural block diagram of a terminal according to an exemplary embodiment of the present disclosure.

FIG. 8 is a structural block diagram of a terminal 800 in accordance with an exemplary embodiment of the present disclosure. The terminal 800 may be a smart phone, a tablet computer, a moving picture experts group audio layer III (MP3) player, a moving picture experts group audio layer IV (MP4) player, a laptop or desk computer. The terminal 800 may also be referred to as a user equipment (UE), a portable terminal, a laptop terminal, a desk terminal, etc.

Generally, the terminal 800 includes a processor 801 and a memory 802.

The processor 801 may include one or more processing cores, such as a 4-core processor and an 8-core processor. The processor 801 may be practiced by using at least one of hardware forms in a digital signal processing (DSP), a field-programmable gate array (FPGA), and a programmable logic array (PLA). The processor 801 may also include a main processor and a coprocessor. The main processor is a processor for processing data in an awake state, and is also called as a central processing unit (CPU). The coprocessor is a low-power processor for processing data in a standby state. In some embodiments, the processor 801 may be integrated with a graphics processing unit (GPU), which is configured to render and draw content required to be displayed by a display. In some embodiments, the processor 801 may also include an artificial intelligence (AI) processor configured to process computational operation related to machine learning.

The memory 802 may include one or more computer-readable storage mediums, which can be non-transitory. The memory 802 may also include a high-speed random access memory, as well as a non-volatile memory, such as one or more disk storage devices and flash storage devices. In some embodiments, the non-transitory computer-readable storage medium in the memory 802 is configured to store at least one instruction. The at least one instruction is configured to be executed by the processor 801 to implement the audio and video processing method provided by the method embodiments of the present disclosure.

In some embodiments, the terminal 800 may optionally include a peripheral device interface 803 and at least one peripheral device. The processor 801, the memory 802, and the peripheral device interface 803 may be connected to each other via a bus or a signal line. Each peripheral device may be connected to the peripheral device interface 803 via a bus, a signal line or a circuit board. Specifically, the peripheral device includes at least one of a radio frequency circuit 804, a display screen 805, a camera component 806, an audio circuit 807, a positioning component 808 and a power source 809.

The peripheral device interface 803 may be configured to connect the at least one peripheral device related to an input/output (I/O) to the processor 801 and the memory 802. In some embodiments, the processor 801, the memory 802 and the peripheral device interface 803 are integrated on the same chip or circuit board. In some other embodiments, any one or two of the processor 801, the memory 802 and the peripheral device interface 803 may be practiced on a separate chip or circuit board, which is not limited in the present embodiment.

The radio frequency circuit 804 is configured to receive and transmit a radio frequency (RF) signal, which is also referred to as an electromagnetic signal. The radio frequency circuit 804 communicates with a communication network and other communication devices via the electromagnetic signal. The radio frequency circuit 804 converts the electrical signal into an electromagnetic signal for transmission, or converts a received electromagnetic signal into an electrical signal. Optionally, the radio frequency circuit 804 includes an antenna system, an RF transceiver, one or more amplifiers, a tuner, an oscillator, a digital signal processor, a codec chipset, a subscriber identity module card, and the like. The radio frequency circuit 804 may communicate with other terminals based on at least one wireless communication protocol. The wireless communication protocol includes, but is not limited to, the World Wide Web, a metropolitan area network, an intranet, various generations of mobile communication networks (2G, 3G, 4G, and 5G), a wireless local area network, and/or a wireless fidelity (WiFi) network. In some embodiments, the radio frequency circuit 804 may further include near field communication (NFC) related circuits, which is not limited in the present disclosure.

The display screen 805 is configured to display a user interface (UI). The UI may include graphics, text, icons, videos, and any combination thereof. When the display screen 805 is a touch display screen, the display screen 805 may further have the capacity of acquiring touch signals on or over the surface of the display screen 805. The touch signal may be input into the processor 801 as a control signal for processing. In this case, the display screen 805 may be further configured to provide a virtual button and/or a virtual keyboard, which are also referred to as a soft button and/or a soft keyboard. In some embodiments, one display screen 805 may be arranged on the front panel of the terminal 800. In some other embodiments, at least two display screens 805 may be arranged respectively on different surfaces of the terminal 800 or designed in a folded fashion. In still some other embodiments, the display screen 805 may be a flexible display screen arranged on a bent or folded surface of the terminal 800. Even, the display screen 805 may be further arranged to an irregular pattern which is non-rectangular, that is, a specially-shaped screen. The display screen 605 may be fabricated from such materials as a liquid crystal display (LCD), an organic light-emitting diode (OLED) and the like.

The camera component 806 is configured to capture images or videos. Optionally, the camera component 806 includes a front camera and a rear camera. Generally, the front camera is arranged on the front panel of the terminal, and the rear camera is arranged on the back of the terminal. In some embodiments, at least two rear cameras are arranged, which are respectively any one of a primary camera, a depth-of-field camera, a wide-angle camera, and a long-focus camera, such that the primary camera and the DOF camera are fused to implement the background virtualization function, and the primary camera and the wide-angle camera are fused to implement the panorama photographing and virtual reality (VR) photographing functions or other fused photographing functions. In some embodiments, the camera component 806 may further include a flash. The flash may be a single-color temperature flash or a double-color temperature flash. The double-color temperature flash refers to a combination of a warm-light flash and a cold-light flash, which may be used for light compensation under different color temperatures.

The audio circuit 807 may include a microphone and a speaker. The microphone is configured to capture acoustic waves of users and environments, and convert the acoustic waves into electrical signals output the electrical signals to the processor 801 for processing, or output to the radio frequency circuit 804 to implement voice communication. For the purpose of stereo capture or noise reduction, a plurality of such microphones may be provided, which are respectively arranged at different locations of the terminal 800. The microphone may also be an array microphone or an omnidirectional capturing microphone. The speaker is configured to convert an electrical signal from the processor 801 or the radio frequency circuit 804 into an acoustic wave. The speaker may be a traditional thin-film speaker or a piezoelectric ceramic speaker. When the speaker is a piezoelectric ceramic speaker, the electrical signal may be converted to an acoustic wave audible by human beings, or an electrical signal may be converted to an acoustic wave inaudible by human beings for the purpose of ranging and the like. In some embodiments, the audio circuit 807 may further include a headphone plug.

The positioning component 808 is configured to locate the current geographic location of the terminal 800 to implement navigation or a location based service (LBS). The positioning component 808 may be a positioning component based on the global positioning system (GPS) from the United States, the Beidou system from China, the Galileo system from European Union.

The power source 809 is configured to supply power for various components in the terminal 800. The power source 809 may be alternating current, a direct current, a disposable battery, or a rechargeable battery. When the power source 809 includes a rechargeable battery, the rechargeable battery may a wired rechargeable battery or a wireless rechargeable battery. The wired rechargeable battery is a battery charged by a cable line, and wireless rechargeable battery is charged by a wireless coil. The rechargeable battery may also support the supercharging technology.

In some embodiments, terminal 800 further includes one or more sensors 810. The one or more sensors 810 include, but are not limited to, an acceleration sensor 811, a gyroscope sensor 812, a pressure sensor 813, a fingerprint sensor 814, an optical sensor 815 and a proximity sensor 816.

The acceleration sensor 811 may detect magnitudes of accelerations on three coordinate axes in a coordinate system established for the terminal 800. For example, the acceleration sensor 811 may be configured to detect components of a gravity acceleration on the three coordinate axes. The processor 801 may control the touch display screen 805 to display a user interface in a horizontal view or a longitudinal view based on a gravity acceleration signal acquired by the acceleration sensor 811. The acceleration sensor 811 may be further configured to acquire motion data of a game or a user.

The gyroscope sensor 812 may detect a direction and a rotation angle of the terminal 800, and may cooperate with the acceleration sensor 811 to capture a 3D action performed by the user for the terminal 800. Based on the data acquired by the gyroscope sensor 812, the processor 801 may implement the following functions: action sensing (such as modifying the UI based on an inclination operation of the user), image stabilization during photographing, game control and inertial navigation.

The pressure sensor 813 may be arranged on a side frame of the terminal 800 and/or a lower layer of the touch display screen 805. When the pressure sensor 813 is arranged on the side frame of the terminal 800, a grip signal of the user against the terminal 800 may be detected, and the processor 601 implements left or right hand identification or perform a shortcut operation based on the grip signal acquired by the force sensor 813. When the pressure sensor 813 is arranged on the lower layer of the touch display screen 805, the processor 801 implement control of an operable control on the UI based on a force operation of the user against the touch display screen 805. The operable control includes at least one of a button control, a scroll bar control, an icon control and a menu control.

The fingerprint sensor 814 is configured to acquire fingerprints of the user. The processor 801 determines the user's identity based on the fingerprints acquired by the fingerprint sensor 814, or the fingerprint sensor 814 determines the user's identity based on the acquired fingerprints. When it is determined that the identity of the user is trustable, the processor 801 authorizes the user to perform related sensitive operations, such as unlocking the screen, checking encrypted information, downloading software, paying, and changing settings. The fingerprint sensor 814 may be arranged on the front, back, or side of the terminal 800. When the terminal 800 is provided with a physical key or a manufacturer's logo, the fingerprint sensor 814 may be integrated with the physical key or the manufacturer's logo.

The optical sensor 815 is configured to acquire intensity of ambient light. In one embodiment, the processor 801 may control the display luminance of the touch display screen 805 based on the intensity of ambient light acquired by the optical sensor 815. For example, when the intensity of ambient light is high, the display luminance of the touch display screen 805 is up-shifted; and when the luminance of ambient light is low, the display luminance of the touch display screen 805 is down-shifted. In another embodiment, the processor 801 may also dynamically adjust photographing parameters of the camera component 806 based on the intensity of ambient light acquired by the optical sensor 815.

The proximity sensor 816, also referred to as a distance sensor, is generally arranged on the front panel of the terminal 800. The proximity sensor 816 is configured to acquire a distance between the user and the front surface of the terminal 800. In one embodiment, when the proximity sensor 816 detects that the distance between the user and the front surface of the terminal 800 gradually decreases, the processor 801 controls the touch display screen 805 to switch from an active state to a rest state. When the proximity sensor 816 detects that the distance between the user and the front surface of the terminal 800 gradually increases, the processor 801 controls the touch display screen 805 to switch from the rest state to the active state.

It will be understood by those skilled in the art that the structure shown in FIG. 8 does not constitute a limitation to the terminal 800, and the terminal may include more or less components than those illustrated, or combine some components or adopt different component deployments.

Figure 9:
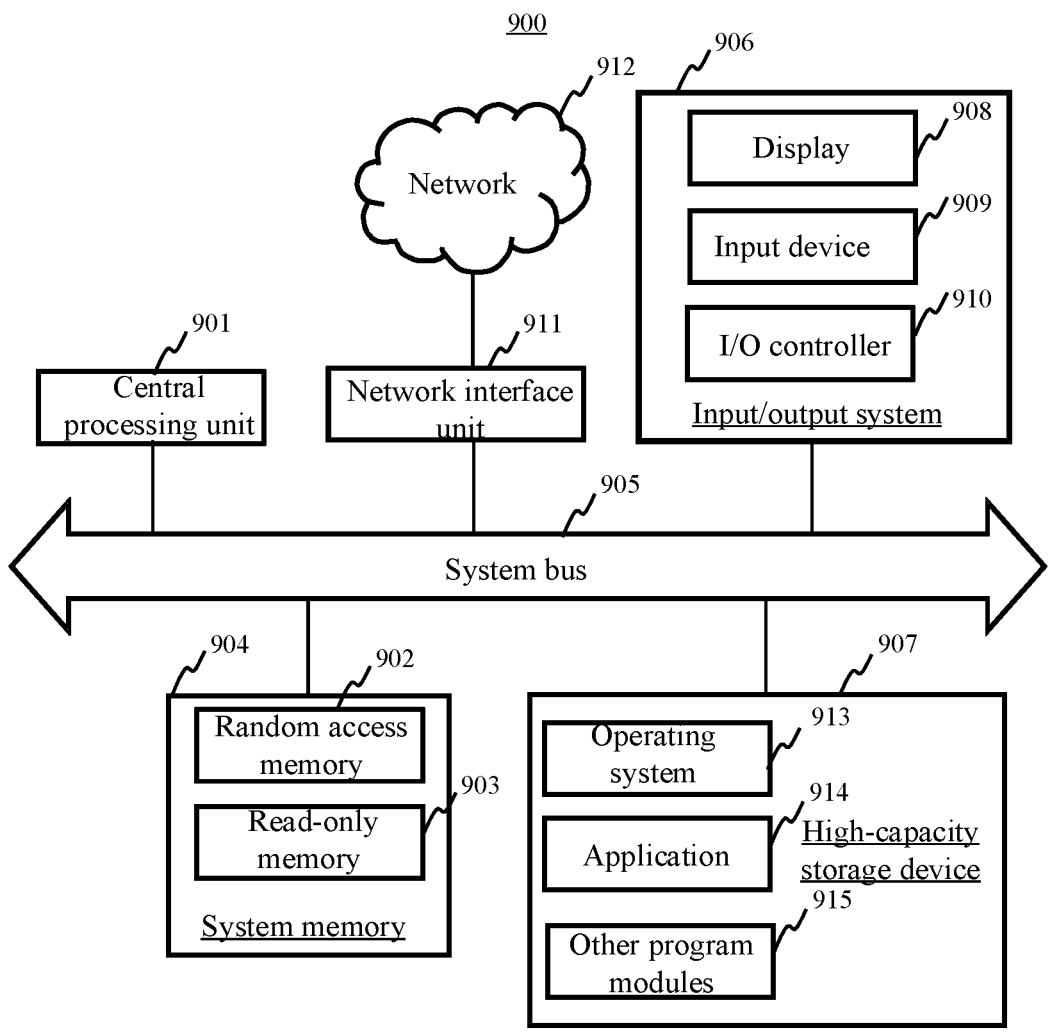
FIG. 9 is a schematic structural diagram of a server according to an exemplary embodiment of the present disclosure.

Please refer to FIG. 9, which shows a schematic structural diagram of a server 900 according to an exemplary embodiment of the present disclosure. The server 900 includes a central processing unit (CPU) 901, a system memory 904 including a random access memory (RAM) 902 and a read-only memory (ROM) 903, and a system bus 905 connecting the system memory 904 and the CPU 901. The server 900 further includes a basic input/output system (I/O system) 906 which helps transmit information between various components within a computer, and a high-capacity storage device 907 for storing an operating system 913, an application 914 and other program modules 915.

The basic I/O system 906 includes a display 908 for displaying information and an input device 909, such as a mouse and a keyboard, for users to input information. The display 908 and the input device 909 are both connected to the CPU 901 through an input/output controller 910 connected to the system bus 905. The basic I/O system 906 may further include the I/O controller 910 for receiving and processing input from a plurality of other devices, such as a keyboard, a mouse and an electronic stylus. Similarly, the input/output controller 910 further provides output to a display screen, a printer or other types of output devices.

The high-capacity storage device 907 is connected to the CPU 901 through a high-capacity storage controller (not shown) connected to the system bus 905. The high-capacity storage device 907 and a computer-readable medium associated therewith provide non-volatile storage for the server 900. That is, the high-capacity storage device 907 may include a computer-readable medium (not shown), such as a hard disk or a CD-ROM drive.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an EPROM, an EEPROM, a flash memory or other solid-state storage technologies, a CD-ROM, DVD or other optical storage; and a tape cartridge, a magnetic tape, a disk storage or other magnetic storage devices. Nevertheless, it may be known by a person skilled in the art that the computer storage medium is not limited to above. The above system memory 904 and the high-capacity storage device 907 may be collectively referred to as the memory.

According to various embodiments of the present disclosure, the server 900 may also be connected to a remote computer on a network through the network, such as the Internet, for operation. That is, the server 900 may be connected to the network 912 through a network interface unit 911 connected to the system bus 905, or may be connected to other types of networks or remote computer systems (not shown) with the network interface unit 911.

Optionally, the memory stores at least one instruction, at least one program, a code set, or an instruction set, and the at least one instruction, the at least one program, the code set, or the instruction set is loaded and executed by a processor to implement the audio and video processing methods according to method embodiments above.

The present disclosure further provides a computer-readable storage medium storing at least one instruction, and the at least one instruction is configured to be executed by a processor to implement the audio and video processing method according to the method embodiments above.

The present disclosure further provides a computer program product containing an instruction, which, when running on the computer, causes the computer to the audio and video processing method according to the method embodiments above.

Persons of ordinary skill in the art can understand that all or part of the steps in the audio and video processing method according to the above embodiments can be completed through hardware, or through relevant hardware instructed by programs stored in a computer-readable storage medium, such as a read-only memory, a disk or a CD, etc. The foregoing descriptions are merely embodiments of the present disclosure, and are not intended to limit the present disclosure. Within principles of the present disclosure, any modifications, equivalent substitutions, improvements, etc., are within the protection scope of the present disclosure.

What is claimed is:

1. An audio and video processing method, applicable to a terminal, the method comprising:
   displaying a video creation interface of a target audio, wherein the video creation interface comprises n audio clips of the target audio and video recording entries corresponding to the n audio clips respectively, wherein n≥2;
   in response to receiving a trigger signal acting on a target video recording entry on the video creation interface;
   acquiring a target video corresponding to a target audio clip, wherein the target video recording entry is a video recording entry corresponding to a target audio clip, the target video is a video clip of which the video duration is less than a duration threshold, and the target audio clip comprises at least two target audio clips and the at least two target audio clips correspond to respective target videos;
   splicing the picture information of at least two target videos corresponding to the at least two audio clips to acquire a first video spliced picture;
   sending a first video creation request carrying the first video spliced picture to the server, wherein the first video creation request is used to instruct the server to store a corresponding relationship between an audio identifier of the target audio and the first video spliced picture, and instruct the terminal to play the first video spliced picture when the terminal requests to play the target audio;
   sending an audio play request of the target audio to the server, wherein the audio play request is used to instruct the server to acquire the first video spliced picture corresponding to the audio identifier of the target audio and feed back a picture play instruction; and
   playing, based on the received picture play instruction, the first video spliced picture when the target audio is played by an audio application.

2. The method according to claim 1, wherein in response to receiving a trigger signal acting on a target video recording entry on the video creation interface, acquiring the target video corresponding to the target audio clip comprises:
in response to receiving the trigger signal, enabling a video recording function, and performing video recording to acquire the target video; or,
in response to receiving the trigger signal, acquiring the target video stored in the terminal;
or,
in response to receiving the trigger signal, sending a video acquisition request to the server, wherein the video acquisition request carries a clip identifier of the target audio clip, and the video acquisition request is used to instruct the server to feed back at least one video corresponding to the clip identifier; and determining the target video from the received at least one video fed back by the server.

3. The method according to claim 1, wherein displaying the video creation interface of the target audio comprises:
displaying an audio association interface of the target audio, wherein the audio association interface comprises a video creation entry; and
displaying the video creation interface of the target audio when a trigger signal acting on the video creation entry is received.

4. The method according to claim 1, further comprising:
acquiring a current first play time point of the target audio, when a picture switch operation signal acting on a first audio clip is received;
sending a picture switch request to the server, wherein the picture switch request carries an audio identifier of the target audio, and the picture switch request is used to instruct the server to acquire a second video spliced picture corresponding to the audio identifier and send a first picture switch instruction to the terminal; and
starting to switch and play the second video spliced picture at the first play time point of the target audio, based on the received first picture switch instruction.

5. The method according to claim 4, wherein the picture switch request further carries the first play time point, and the picture switch request is further used to instruct the server to acquire a second candidate video corresponding to the first audio clip at the first play time point in response to absence of the second video spliced picture corresponding to the audio identifier and send a second picture switch instruction to the terminal; and
the method further comprises:
starting to switch and play picture information of the second candidate video at the first play time point of the target audio during play of the first audio clip, based on the received second picture switch instruction.

6. An audio and video processing apparatus, applicable to a terminal, the apparatus comprising:
a displaying module, configured to display a video creation interface of a target audio, wherein the video creation interface comprises n audio clips of the target audio and video recording entries corresponding to the n audio clips respectively, wherein n≥2;
an acquiring module, configured to acquire a target video corresponding to a target audio clip in response to receiving, by a receiving module, a trigger signal acting on a target video recording entry on the video creation interface, wherein the target video recording entry is a video recording entry corresponding to a target audio clip, the target video is a video clip of which the video duration is less than a duration threshold, and the target audio clip comprises at least two target audio clips and the at least two target audio clips correspond to respective target videos;
a sending module, configured to send a first video creation request carrying the first video spliced picture to the server, wherein the first video creation request is used to instruct the server to store a corresponding relationship between an audio identifier of the target audio and the first video spliced picture, and instruct the terminal to play the first video spliced picture when the terminal requests to play the target audio; and
a playing module, configured to send an audio play request of the target audio to the server, wherein the audio play request is used to instruct the server to acquire the first video spliced picture corresponding to the audio identifier of the target audio and feed back a picture play instruction; and play, based on the received picture play instruction, the first video spliced picture when the target audio is played by an audio application.

7. The apparatus according to claim 6, wherein the acquiring module is further configured to enable a video recording function in response to receiving the trigger signal, and perform video recording to acquire the target video;
or,
acquire the target video stored in the terminal in response to receiving the trigger signal;
or,
send a video acquisition request to the server in response to receiving the trigger signal, wherein the video acquisition request carries a clip identifier of the target audio clip, and the video acquisition request is used to instruct the server to feed back at least one video corresponding to the clip identifier; and determine the target video from the received at least one video fed back by the server.

8. The apparatus according to claim 6, wherein the displaying module is further configured to display an audio association interface of the target audio, wherein the audio association interface comprises a video creation entry; and
display the video creation interface of the target audio when a trigger signal acting on the video creation entry is received.

9. The apparatus according to claim 6, further comprising:
a first picture switching module, configured to:
acquire a current first play time point of the target audio, when a picture switch operation signal acting on a first audio clip is received;
send a picture switch request to the server, wherein the picture switch request carries an audio identifier of the target audio, and the picture switch request is used to instruct the server to acquire a second video spliced picture corresponding to the audio identifier, and send a first picture switch instruction to the terminal; and
start to switch and play the second video spliced picture at the first play time point of the target audio, based on the received first picture switch instruction.

10. The apparatus according to claim 9, wherein the picture switch request further carries the first play time point, and the picture switch request is further used to instruct the server to acquire a second candidate video corresponding to the first audio clip at the first play time point in response to absence of the second video spliced picture corresponding to the audio identifier, and send a second picture switch instruction to the terminal;

the apparatus further comprises a second picture switching module, configured to:

start to switch and play picture information of the second candidate video at the first play time point of the target audio during play of the first audio clip, based on the received second picture switch instruction.

11. The apparatus according to claim 6, further comprising:

a display switching module, configured to switch from display of the picture information of the first candidate video to display of video production information of the first candidate video when specified time content of the target audio is played, wherein the first candidate video is a candidate video corresponding to the audio clip where the specified time content is, the specified time content comprises at least one of intro content, interlude content, and ending content, and the video production information comprises at least one of recorder information, uploader information, and splicer information which correspond to the first candidate video.

12. A terminal, comprising a processor and a memory, wherein the memory stores at least one instruction that, when executed by the processor, causes the processor to implement the audio and video processing method according to claim 1.

13. A non-transitory computer-readable storage medium storing at least one instruction, wherein the at least one instruction, when executed by a processor, causes the processor to implement the audio and video processing method according to claim 1.

* * * * *